(12) United States Patent
Hara

(10) Patent No.: US 8,961,204 B2
(45) Date of Patent: Feb. 24, 2015

(54) CHARGE CONNECTOR

(75) Inventor: Nobuhiko Hara, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 41 days.

(21) Appl. No.: 13/816,174

(22) PCT Filed: Apr. 11, 2011

(86) PCT No.: PCT/JP2011/058973
§ 371 (c)(1),
(2), (4) Date: Apr. 12, 2013

(87) PCT Pub. No.: WO2012/042954
PCT Pub. Date: Apr. 5, 2012

(65) Prior Publication Data
US 2013/0196522 A1    Aug. 1, 2013

(30) Foreign Application Priority Data
Sep. 29, 2010  (JP) ................................ 2010-220033

(51) Int. Cl.
*H01R 13/44* (2006.01)
*H01R 13/447* (2006.01)
(Continued)

(52) U.S. Cl.
CPC .......... *H01R 13/447* (2013.01); *B60L 11/1818* (2013.01); *H01M 10/44* (2013.01);
(Continued)

(58) Field of Classification Search
USPC ................................................. 439/142, 144
See application file for complete search history.

(56) References Cited

U.S. PATENT DOCUMENTS 1,050,265 A * 1/1913 Crone ......................... 220/259.2
2,054,145 A * 9/1936 Tandy ........................... 280/834
(Continued)

FOREIGN PATENT DOCUMENTS

JP        3-69530 U       7/1991
JP        6-325819 A     11/1994
(Continued)

OTHER PUBLICATIONS

International Search Report for Application No. PCT/JP2011/058973 dated Jul. 19, 2011.

*Primary Examiner* — Phuong Dinh
(74) *Attorney, Agent, or Firm* — Alston & Bird LLP

(57) ABSTRACT

An object is to provide a charge connector that can close an inner lid section and an outer lid section by one action to reliably avoid forgetting to close the inner lid section.
A charge connector 100 includes: an opening section 108 arranged on a vehicle; a connector connection section 112 to which a cable for charging a battery is connected; an inner lid section 114 that seals a connector connection section in the opening section; an inner lid hinge 115 that is arranged in an opening and that rotates the inner lid section; an outer lid section 106 that seals the opening section from outside of the vehicle; and an outer lid hinge 120 that is installed on an opposite side of the inner lid hinge around the connector connection section and that rotates the outer lid section in a same plane as the inner lid section, wherein the outer lid section includes a rib 122 that projects inside of the opening section on a surface closer to the opening section, the rib can be in contact with the inner lid section, and when the rib is in contact with the inner lid section, the rib is formed so that a normal line at a point of contact with the inner lid section in the plane, in which the inner lid section rotates, passes on a side of the inner lid hinge closer to the outer lid hinge.

6 Claims, 8 Drawing Sheets

(51) Int. Cl.
*B60L 11/18* (2006.01)
*H01M 10/44* (2006.01)
*H01M 10/46* (2006.01)
*H01R 13/52* (2006.01)
*B60K 1/04* (2006.01)

(52) U.S. Cl.
CPC .......... *H01M 10/46* (2013.01); *H01R 13/5213* (2013.01); *B60L 2270/32* (2013.01); *B60L 2270/34* (2013.01); *Y02T 10/7005* (2013.01); *Y02T 10/7088* (2013.01); *Y02T 90/121* (2013.01); *Y02T 90/14* (2013.01); *B60K 1/04* (2013.01)
USPC ........................................................ 439/142

(56) References Cited

U.S. PATENT DOCUMENTS

| | | | | |
|---|---|---|---|---|
| 4,502,747 | A | * | 3/1985 | Bright et al. ................... 439/296 |
| 5,501,607 | A | | 3/1996 | Yoshioka et al. |
| 5,580,258 | A | * | 12/1996 | Wakata ......................... 439/142 |

FOREIGN PATENT DOCUMENTS

| | | |
|---|---|---|
| JP | 2009-027851 A | 2/2009 |
| JP | 2009-087759 A | 4/2009 |
| JP | 2009-146711 A | 7/2009 |
| JP | 2010-148299 A | 7/2010 |

* cited by examiner (a1 > 90°)

CHARGE CONNECTOR

TECHNICAL FIELD

The present invention relates to a charge connector installed on a vehicle including a battery that can be charged from an external power supply, wherein a cable for charging is plugged into the charge connector.

BACKGROUND ART

In recent years, automobiles that use electric motors as power sources, such as electric automobiles and hybrid cars, are widely used. Batteries that supply electricity to the electric motors are mounted on the automobiles.

For methods of charging the batteries, there are a plurality of systems according to the types of the batteries and the automobiles. For example, many hybrid cars use power of engines to operate generators to generate electricity to charge the batteries. In the electric automobiles and some of the hybrid cars (plug-in hybrid cars), cables for charging can be plugged into the vehicles to directly charge the batteries from external power supplies. Therefore, charge connectors for plugging in the cables are installed on the plug-in hybrid cars and the like.

The charge connectors are mainly arranged on outer panels of the vehicles, and many of the charge connectors include double lids to improve the sealing performance. For example, a charging inlet structure described in PTL 1 includes: an opening arranged on an outer panel; a charging inlet (connector connection section) arranged inside of the opening; a charging inlet cap (inner lid section) that covers the connector connection section and that can be opened and closed; and a lid (outer lid section) that covers the opening from the outside and that can be opened and closed. In PTL 1, hinge axes of the inner lid section and the outer lid section are arranged on opposite sides across the connector connection section, and the inner lid section and the outer lid section need to be individually closed. Therefore, it is stated that the inner lid section can be completely closed (forgetting to close the inner lid section can be prevented).

CITATION LIST

Patent Literature

PTL 1: Japanese Patent Application Laid-Open No. 2009-87759

SUMMARY OF INVENTION

Technical Problem

However, in PTL 1, the operation of closing the inner lid section is strictly performed manually. Therefore, although the configuration may reduce the probability of forgetting to close the inner lid section, whether the inner lid section is closed depends on manual operation and is not certain.

In view of this problem, an object of the present invention is to provide a charge connector that can close an inner lid section and an outer lid section by one action to reliably prevent forgetting to close the inner lid section.

Solution to Problem

To solve this problem, a representative configuration of a charge connector according to the present invention is a charge connection characterized by including: an opening section arranged on a vehicle; a connector connection section installed inside of the opening section and to which a plug of a cable for charging a battery of the vehicle is connected; an inner lid section that seals the connector connection section inside of the opening section; an inner lid hinge that is installed inside of the opening section and that rotates the inner lid section; an outer lid section that seals the opening section from outside of the vehicle; and an outer lid hinge that is installed on an opposite side of the inner lid hinge around the connector connection section and that rotates the outer lid section in a same plane as the inner lid section, wherein the outer lid section includes a rib that projects inside of the opening section on a surface closer to the opening section, the rib can be in contact with the inner lid section, and when the rib is in contact with the inner lid section, the rib is formed so that a normal line at a point of contact with the inner lid section in the plane, in which the inner lid section rotates, passes on a side of the inner lid hinge closer to the outer lid hinge.

Advantageous Effects of Invention

The outer lid section and the inner lid section can rotate in the same plane. When both the outer lid section and the inner lid section are open, the rib of the outer lid section contacts the inner lid section by closing the outer lid section. In this case, the normal line at the point of contact of the rib and the inner lid section passes on the side of the inner lid hinge closer to the outer lid hinge, i.e. the side closer to the connector connection section. Therefore, the inner lid section also rotates in the direction of closing the connector connection section by closing the outer lid section. According to the configurations, the outer lid section and the inner lid section are closed together by one action. Therefore, forgetting to close the inner lid section can be avoided, and the connector connection section can be reliably protected.

The rib can have an arc shape, and a center can be on the side of the inner lid hinge closer to the outer lid hinge in a plane, in which the outer lid hinge rotates. According to the configuration, the rib and the inner lid section are in point contact. Therefore, the inner lid section can easily slide over the rib, and the inner lid section can be smoothly closed. The point contact can prevent the rib and the inner lid section from damaging each other when in contact.

The arc shape of the rib may have a same radius of curvature as that of a circle depicted by a tip of the rotating inner lid section. In this way, the rib can be formed according to the rotation of the inner lid section to more smoothly slide and close the inner lid section.

The rib may include: a tip section arranged closer to a tip of the outer lid section; and a root section arranged closer to a root of the outer lid section, the radius of curvature of the tip section may be smaller than the radius of curvature of the circle depicted by the tip of the rotating inner lid section, and the radius of curvature of the root section may be equal to or greater than the radius of curvature of the circle depicted by the tip of the rotating inner lid section.

The tip section is a section that comes in contact with the inner lid section earlier than the root section. The tip section depicts a steep arc. Therefore, even if the inner lid section is widely open, the rib can come in contact with the inner lid section to guide the inner lid section in the direction of closing. As the outer lid section is closed, the inner lid section can be smoothly closed along the gentle arc of the root section.

The radius of curvature of the tip section and the root section can gradually change from the tip section to the root section. According to this, the inner lid section can be more smoothly rotated.

The tip section and the root section may be separate from each other, and the outer lid section may further include a plane section arranged between the tip section and the root section. According to the configuration, one action of closing the outer lid section can also close the inner lid section.

An amount of projection of the rib inside of the opening section on a side closer to the root can be an amount of abutment with the inner lid section that seals the connector connection section when the outer lid section is closed. According to the configuration, the inner lid section can be completely closed in conjunction with the outer lid section.

DESCRIPTION OF EMBODIMENTS

Figure 1:
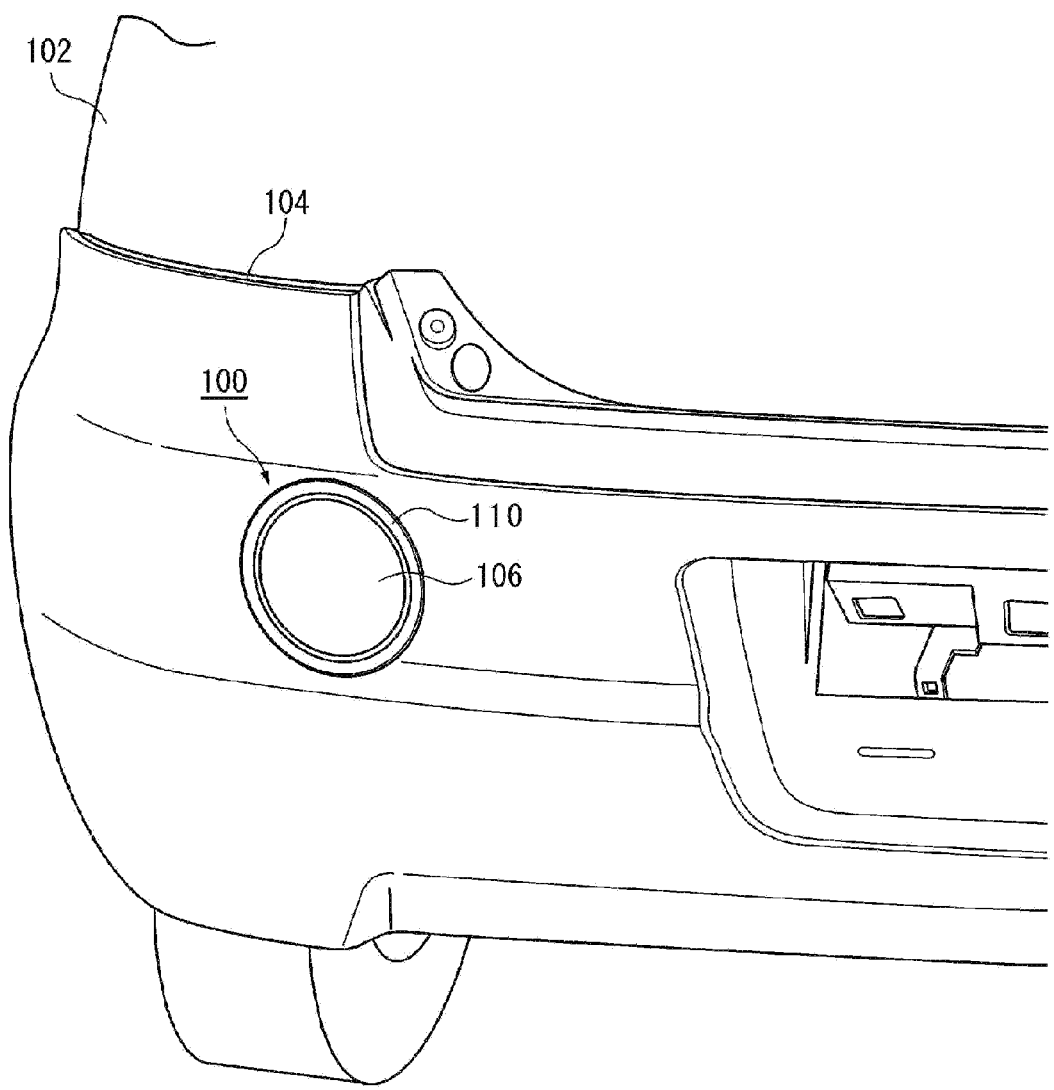
FIG. 1 is a diagram illustrating a vehicle including a charge connector according to the present invention.

Preferred embodiments of the present invention will be described in detail with reference to the attached drawings. Dimensions, materials, and other specific numeric values shown in the embodiments are just examples for facilitating understanding of the invention and are not intended to limit the present invention, unless otherwise specifically stated. In the specification and the drawings, elements with substantially the same functions and configurations are designated with the same reference numerals to omit overlapping description, and illustrations of the elements not directly related to the present invention are omitted.

Charge Connector

FIG. 1 is a diagram illustrating a vehicle 102 including a charge connector 100 according to the present invention. The charge connector 100 can be arranged on a rear bumper 104 of the vehicle 102. The charge connector 100 is used to charge a battery (not shown) mounted on the vehicle 102. A plug-in hybrid car is envisaged as the vehicle 102.

As illustrated in FIG. 1, the charge connector 100 includes an outer lid section 106. The outer lid section 106 is a lid body that is also called a connector lid. A shape of a circumference of the outer lid section 106 is formed according to a shape of a bezel 110 described later, and intrusion of rain water, dust, and the like into the charge connector 100 is prevented. The outer lid section 106 is supported by an arm 118 extending from inside of a casing 107 (see FIG. 2).

Figure 2:
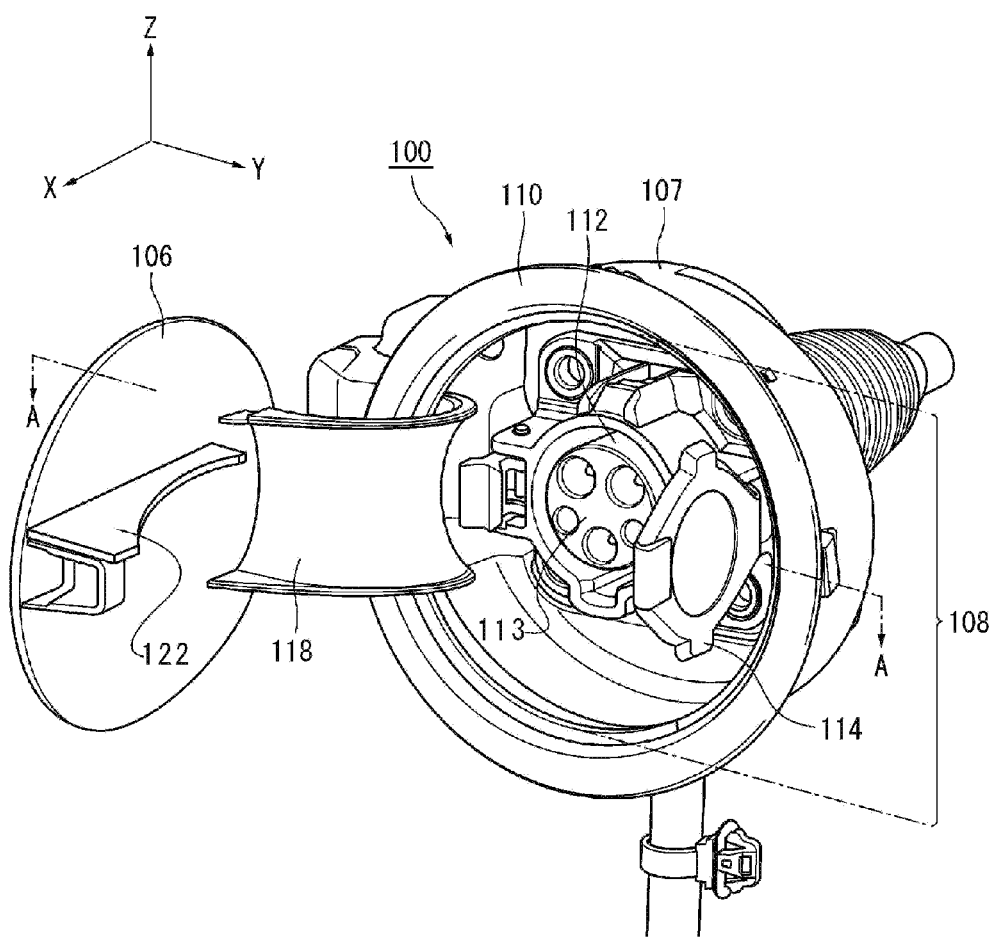
FIG. 2 is a diagram illustrating the charge connector in which an outer lid section of FIG. 1 is opened.

FIG. 2 is a diagram illustrating the charge connector 100 in which the outer lid section 106 of FIG. 1 is opened. In FIG. 2, the rear bumper 104 is omitted to facilitate understanding of the constituent elements forming the charge connector 100.

As illustrated in FIG. 2, the charge connector 100 includes a wide-mouth bowl-shaped casing 107. An internal space extends inside of the casing 107. A connector connection section 112 and the like described later are installed in the internal space.

An annular-shaped bezel 110 (connector lid bezel) is installed on an edge of the casing 107. An internal circumference of the bezel 110 forms an opening section 108 of the charge connector 100. A cable for charging (not shown) is plugged inside of the casing 107 through the opening section 108. The outer lid section 106 can seal the opening section 108 from the outside.

In FIG. 2 and the following drawings, a vertical direction in a plane formed by the opening section 108 is a Z direction, and a horizontal direction in the plane formed by the opening section 108 that is a direction orthogonal to the Z direction is a Y direction. A direction that is orthogonal to the Z direction and the Y direction and that indicates front and back of the opening section 108 is an X direction.

The connector connection section 112 is arranged inside of the casing 107, wherein a terminal surface 113 faces the opening section 108. The connector connection section 112 is connected to the battery in the vehicle, and a plug (not shown) of a cable for charging extending from an external power supply is connected.

An inner lid section 114 is provided near the terminal surface of the connector connection section 112. The inner lid section 114 is a lid body that seals the connector connection section 112 inside of the casing 107. The installation of the inner lid section 114 in addition to the outer lid section 106 can reliably protect a terminal of the connector connection section 112 from rain water and the like.

A rib 122 is arranged on a surface of the outer lid section 106 closer to the opening section. The rib 122 has a function of associating an action of closing the inner lid section 114 with an action of closing the outer lid section 106. The rib 122 is formed to project inside of the opening section 108 to contact the inner lid section 114 when the outer lid section 106 is closed.

Figure 3:
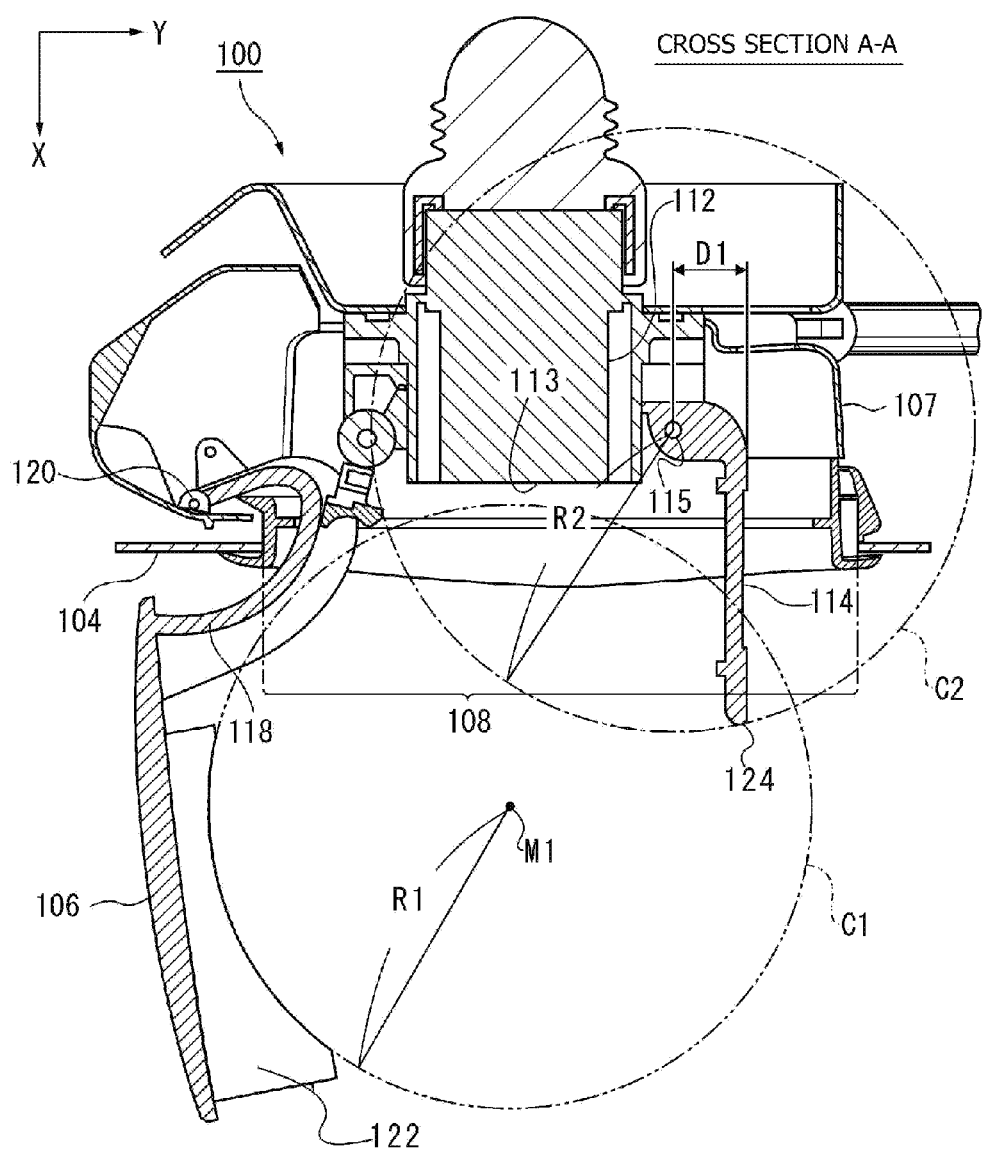
FIG. 3 is an A-A cross-sectional view of the charge connector of FIG. 2.

FIG. 3 is an A-A cross-sectional view of the charge connector 100 of FIG. 2. The A-A cross section of FIG. 2 is a cross-sectional view of an XY plane at the center of the charge connector 100.

An inner lid hinge 115 supports the inner lid section 114, and the inner lid section 114 can be opened and closed. Meanwhile, an outer lid hinge 120 supports the outer lid section 106, and the outer lid section 106 can be opened and closed. The inner lid hinge 115 and the outer lid hinge 120 are installed opposite of each other around the connector connection section 112, and axial directions of the inner lid hinge 115 and the outer lid hinge 120 are parallel (Z direction illustrated in FIG. 2). The inner lid hinge 115 and the outer lid hinge 120 rotate the inner lid section 114 and the outer lid section 106, respectively, in the same plane (in the XY plane illustrated in FIG. 3).

Figure 5A:
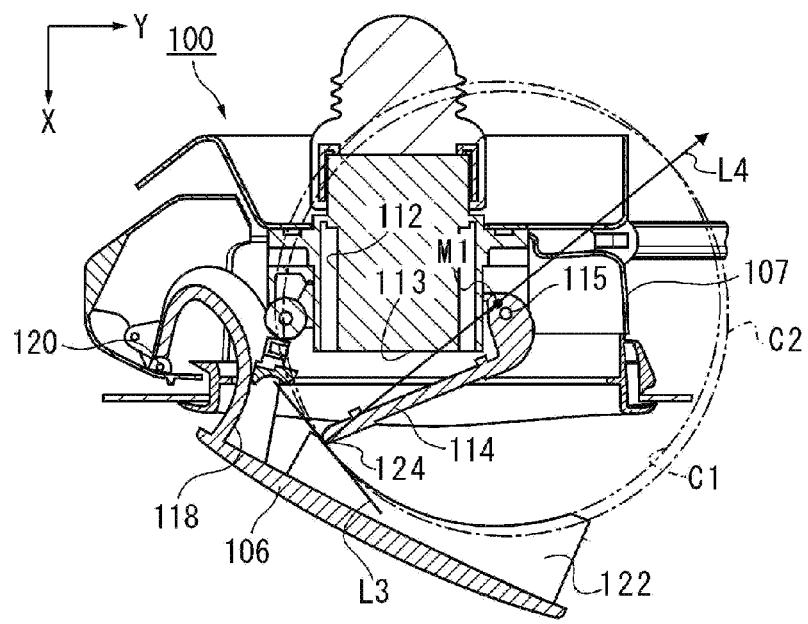
FIG. 5 is a diagram illustrating an action of closing the outer lid section and the inner lid section of FIG. 3.
Figure 5B:
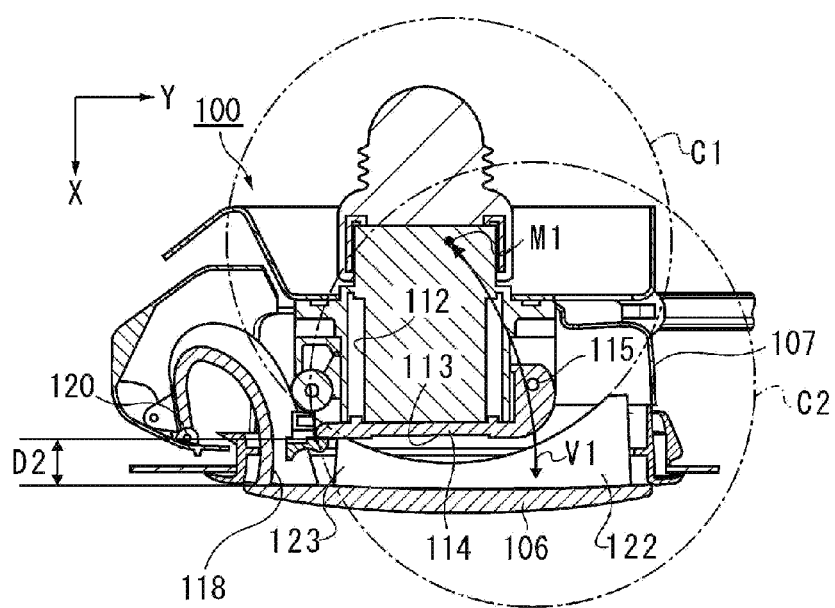

The rib 122 included in the outer lid section 106 has an arc shape, and a center M1 is on a side of the inner lid hinge 115 closer to the outer lid hinge 120 in the plane (in the XY plane) where the outer lid hinge 120 rotates (see a track V1 of the center M1 in FIG. 5(b)). A circle C1 depicted by the arc of the rib 122 is formed to have the same radius of curvature as that of a circle C2 depicted by a tip 124 of the rotating inner lid section 114 (radius R1=radius R2).

FIGS. 4 and 5 are diagrams illustrating actions of closing the outer lid section 106 and the inner lid section 114 of FIG.

3. FIGS. 4 and 5 are diagrams corresponding to FIG. 3. As in FIG. 3, the XY plane of the charge connector 100 illustrated in FIGS. 4 and 5 is the plane in which the outer lid section 106 and the inner lid section 114 rotate.

Figure 4A:
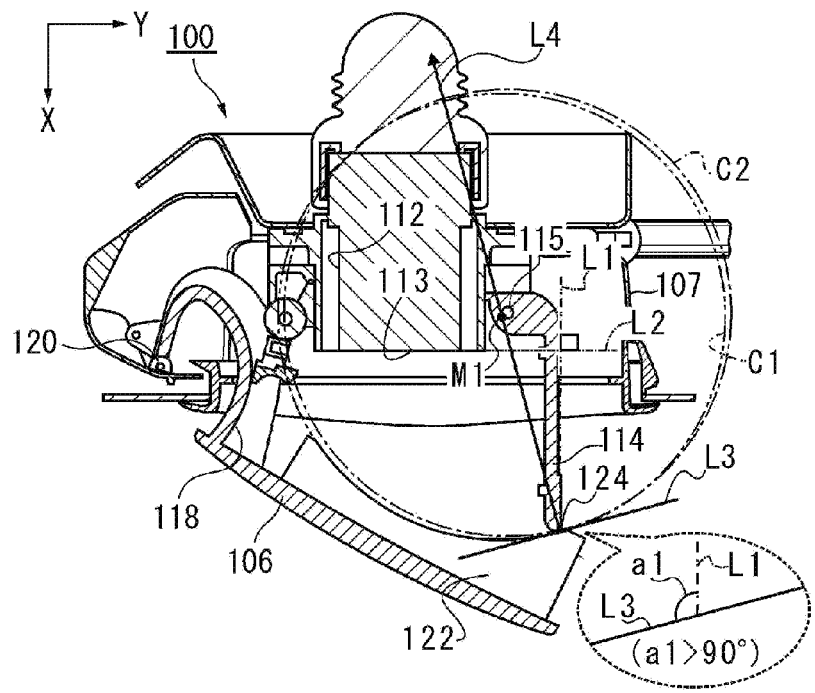
FIG. 4 is a diagram illustrating an action of closing the outer lid section and an inner lid section of FIG. 3.
Figure 4B:
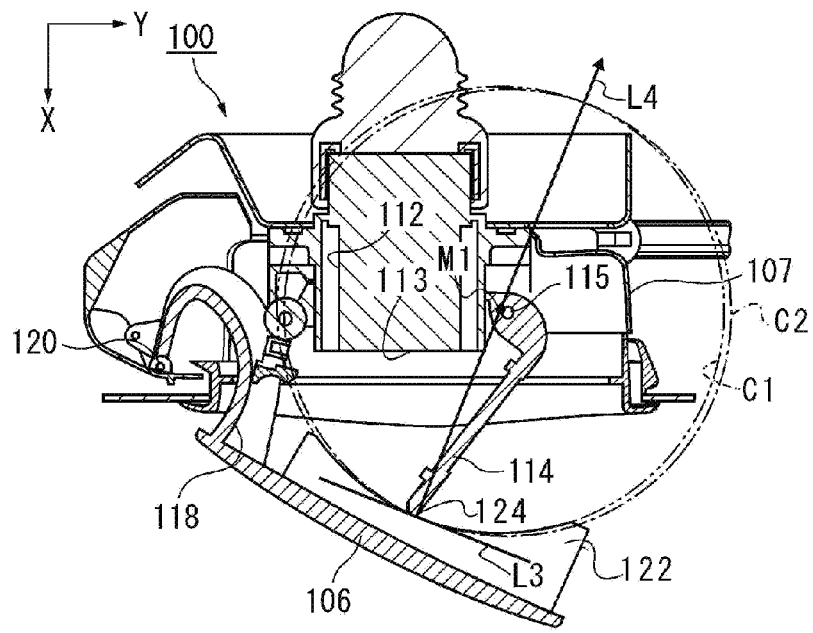

As illustrated in FIG. 4(a), the inner lid section 114 (line segment L1) opens substantially 90° relative to the terminal surface 113 (line segment L2) of the connector connection section 112. In this way, if the outer lid section 106 is closed while the inner lid section 114 is open, the tip 124 of the inner lid section 114 contacts the rib 122.

The rib 122 is formed so that when the rib 122 is in contact with the inner lid section 114, a normal line L4 at a point of contact (point of contact with the tip 124) passes on the side of the inner lid hinge 115 closer to the outer lid hinge 120. The side closer to the outer lid hinge is, in other words, the side closer to the connector connection section 112. Particularly, in the present embodiment, the rib 122 is formed so that an angle a1 between the inner lid section 114 (line segment L1) and tangent L3 is an obtuse angle (a1>90°) on the side closer to the outer lid hinge 120 in the XY plane. More specifically, the rib 122 comes in contact with the inner lid section 114 from the front side (outside surface when the connector connection 112 is sealed).

As illustrated in FIG. 3, the inner lid section 114 is formed to be separate (offset) from the inner lid hinge 115 by a distance D1. In this way, since the inner lid section 114 is offset from the inner lid hinge 115, the inner lid section 114 can more widely open the connector connection section 112.

According to the configuration, when the outer lid section 106 is closed from the state of FIG. 4(a), a moment of force for clockwise rotation in the drawings is applied from the rib 122 to the inner lid section 114. Consequently, the inner lid hinge 115 rotates clockwise in the drawings (see FIG. 4(b)), while the tip 124 of the inner lid section 114 slides over the rib 122. Therefore, the inner lid hinge 115 rotates in a direction in which the inner lid section 114 is closed.

As illustrated in FIG. 5(a), when the outer lid section 106 is started to be closed, the inner lid section 114 is also started to be closed accordingly. Ultimately, as illustrated in FIG. 5(b), when the outer lid section 106 is closed, the inner lid section 114 is also closed. An amount of projection D2 inside of the opening section 108 on a root side 123 of the rib 122 corresponds to an amount of abutment with the inner lid section 114 that seals the connector connection section 112 when the outer lid section 106 is closed. According to the configuration, the inner lid section 114 can be completely closed in conjunction with the outer lid section 106.

Since the rib 122 has an arc shape, the rib 122 and the inner lid section 114 are in point contact. Therefore, the inner lid section 114 easily slides over the rib, and the inner lid section 114 can be smoothly closed. The point contact can also prevent the rib 122 and the inner lid section 114 from damaging each other when in contact.

The radius of curvature of the rib 122 (radius R1 in FIG. 3) is the same as the radius of curvature of the circle C2 depicted by the tip 124 of the rotating inner lid section 114 (radius R1=radius R2). In this way, the rib 122 is formed according to the rotation of the inner lid section 114, and the inner lid section 114 can be more smoothly slid and closed.

The shape of the rib 122 does not always have to correspond to the circle C2. FIG. 5(b) illustrates the track V1 of the rotation of the center M1 of the circle C1 depicted by the arc of the rib 122. The track V1 passes on the side of the rotation center (inner lid hinge 115) of the inner lid section 114, closer to the outer lid hinge 120. As a result, during the rotation, the normal line L4 (see FIG. 5(a)) at the contact point of the rib 122 and the inner lid section 114 also always passes on the side of the inner lid hinge 115 closer to the outer lid hinge 120. Therefore, a vector of force in the direction of closing is applied to the inner lid section 114. In this way, the rib 122 is formed so that the track of at least the center M1 of the arc is on the side of the inner lid hinge 115 closer to the outer lid hinge 120, and therefore, the inner lid section 114 can be closed.

As described, according to the configuration, one action of closing the outer lid section 106 can also close the inner lid section 114. Therefore, forgetting to close the inner lid section 114 can be prevented, and the connector connection section 112 can be surely projected.

First Modified Example

FIG. 6 is a diagram illustrating a first modified example of the charge connector 100. FIG. 6 corresponds to FIGS. 4 and 5 and illustrates an action of closing the outer lid section 106 and the inner lid section 114. The shape of a rib 222 illustrated in FIG. 6 is different from that of the rib 122 illustrated in FIGS. 4 and 5.

Figure 6A:
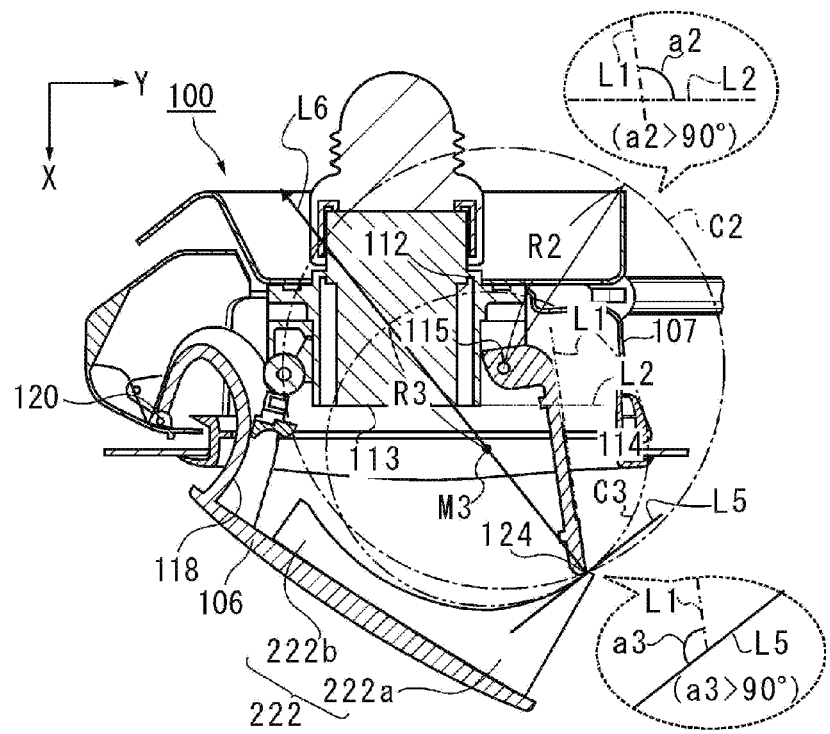
FIG. 6 is a diagram illustrating a first modified example of the charge connector.

As illustrated in FIG. 6(a), the rib 222 includes a tip section 222a arranged closer to the tip of the outer lid section 106 and a root section 222b arranged closer to the root of the outer lid section 106.

The tip section 222a is a section that comes in contact with the inner lid section 114 earlier than the root section 222b. The tip section 222a projects more widely than the root section 222b. The radius of curvature (radius R3) of the tip section 222a is smaller than the radius of curvature of the circle C2 (radius R3<radius R2). More specifically, a circle C3 (center M3) depicted by the arc of the tip section 222a is smaller than the circle C2. In this way, the tip section 222a widely projects and depicts a steep arc. Therefore, even if the inner lid section 114 (line segment L1) is widely open relative to the terminal surface 113 (line segment L2) (angle a2 between line segment L1 and line segment L2>90°), the rib 222 can contact the tip 124 of the inner lid section 114 to guide the inner lid section 114 in the direction of closing.

The rib 222 (particularly the tip section 222a) is formed so that a normal line L6 at a point of contact with the inner lid section 114 (point of contact with the tip 124) passes on the side of the inner lid hinge 115 closer to the outer lid hinge (closer to the connector connection section). The rib 222 and the inner lid section 114 are formed so that an angle a3 between the inner lid section 114 (line segment L1) and tangent L5 is an obtuse angle (a3>90°). As a result, when the outer lid section 106 is closed, a moment of force for clockwise rotation in the drawings is surely applied from the rib 222 to the inner lid section 114.

Figure 6B:
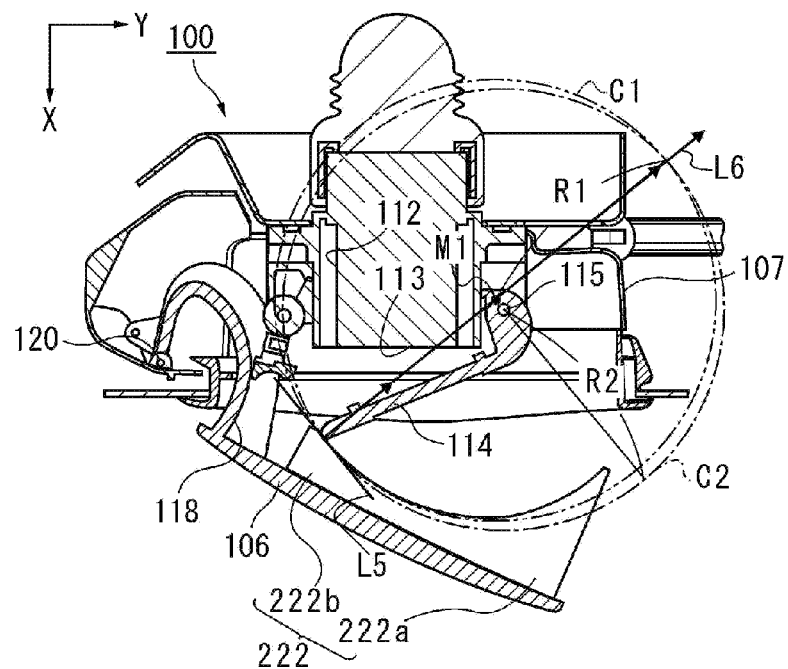

FIG. 6(b) illustrates a state in which the outer lid section 106 is further closed compared to FIG. 6(a). As illustrated in FIG. 6(b), when the outer lid section 106 is closed, the tip 124 of the inner lid section 114 rotates while sliding over the rib. The tip 124 of the inner lid section 114 reaches the root section 222b of the rib 222. The radius of curvature of the root section 222b can be equal to or greater than the radius of curvature of the circle C2, and for example, the root section 222b of FIG. 6(b) depicts the circle C1 with substantially the same radius of curvature as that of the circle C2 (radius R1=radius R2). Therefore, the radius of curvature (radius R1) of the root section 222b is greater than the radius of curvature (radius R3) of the tip section 222a.

The rib 222 is formed so that the radii of curvature (radius R3 and radius R1) of the tip section 222a and the root section 222b gradually change from the tip section 222a to the root section 222b. This is for more smooth rotation of the inner lid section 114.

According to the configuration, even if the inner lid section 114 is widely open, the tip section 222a can surely apply a moment of force in the direction of closing, and the inner lid section 114 can be gradually and smoothly closed along the gentle arc of the root section 222b.

Second Modified Example

FIGS. 7 and 8 are diagrams illustrating a second modified example of the charge connector 100. FIGS. 7 and 8 correspond to FIGS. 4 and 5 and illustrate actions of closing the outer lid section 106 and the inner lid section 114. The shape of a rib 322 illustrated in FIGS. 7 and 8 is different from the shapes of the ribs 122 and 222.

If the inner lid section 114 (line segment L1) is widely open relative to the terminal surface 113 (line segment L2), and the rib is formed accordingly, the arc shape of the rib may not be entirely formed on the outer lid section. In this case, the arc shape may be broken in the middle as in the rib 322 illustrated in FIG. 7(a).

The rib 322 includes a tip section 322a arranged closer to the tip of the outer lid section 106 and a root section 322b that is separate from the tip section 322a and that is arranged closer to the root of the outer lid section 106. The outer lid section 106 includes a plane section 324 arranged between the tip section 322a and the root section 322b.

The tip section 322a is a section that first comes in contact with the inner lid section 114. The radius of curvature (radius R3) of the tip section 322a is smaller than the radius of curvature of the circle C2 (radius R3<radius R2), and a steep arc is depicted. Therefore, even if the inner lid section 114 is widely open, the tip 124 of the inner lid section 114 can be contacted.

Figure 7A:
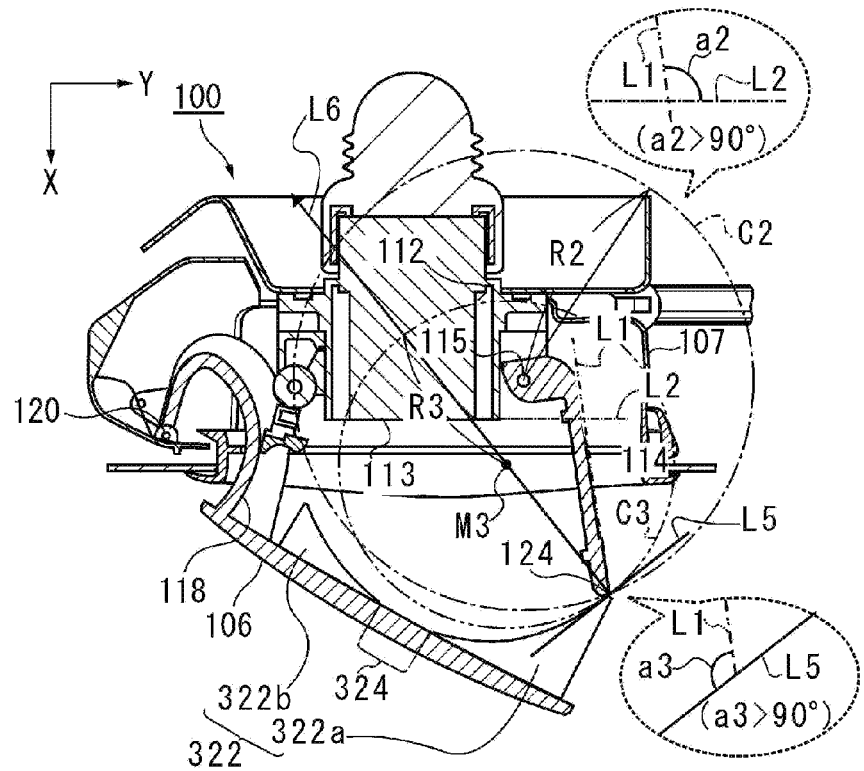
FIG. 7 is a diagram illustrating a second modified example of the charge connector.
Figure 7B:
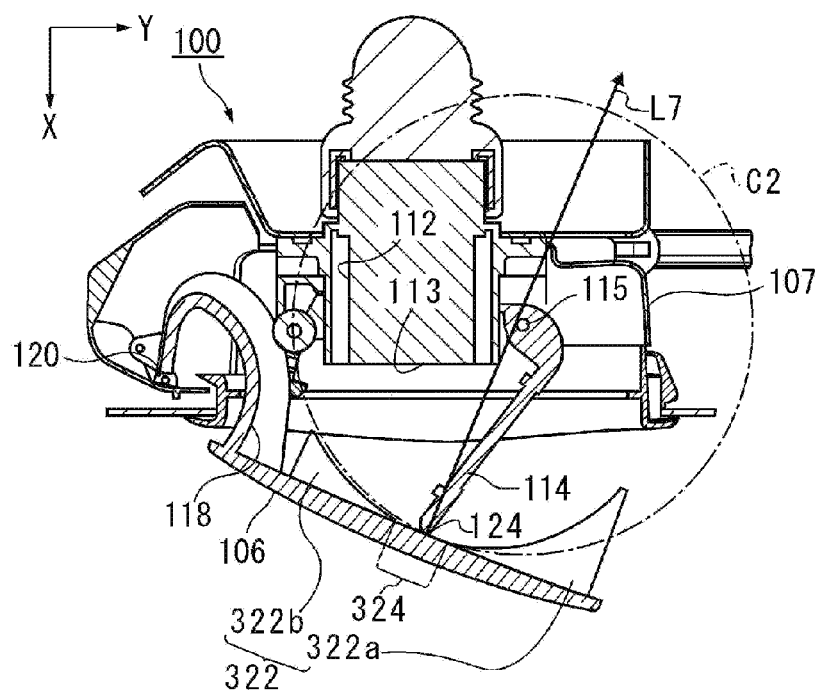

FIG. 7(b) illustrates a state in which the outer lid section 106 is further closed compared to FIG. 7(a). As illustrated in FIG. 7(b), when the outer lid section 106 is closed, the tip 124 of the inner lid section 114 reaches the plane section 324. Although the plane section 324 does not depict an arc, a normal line L7 at the point of contact of the inner lid section 114 and the tip 124 in the plane section 324 passes on the side of the inner lid hinge 115 closer to the outer lid hinge 120. Therefore, the inner lid section 114 can also be rotated in the direction of closing based on the plane section 324.

Figure 8A:
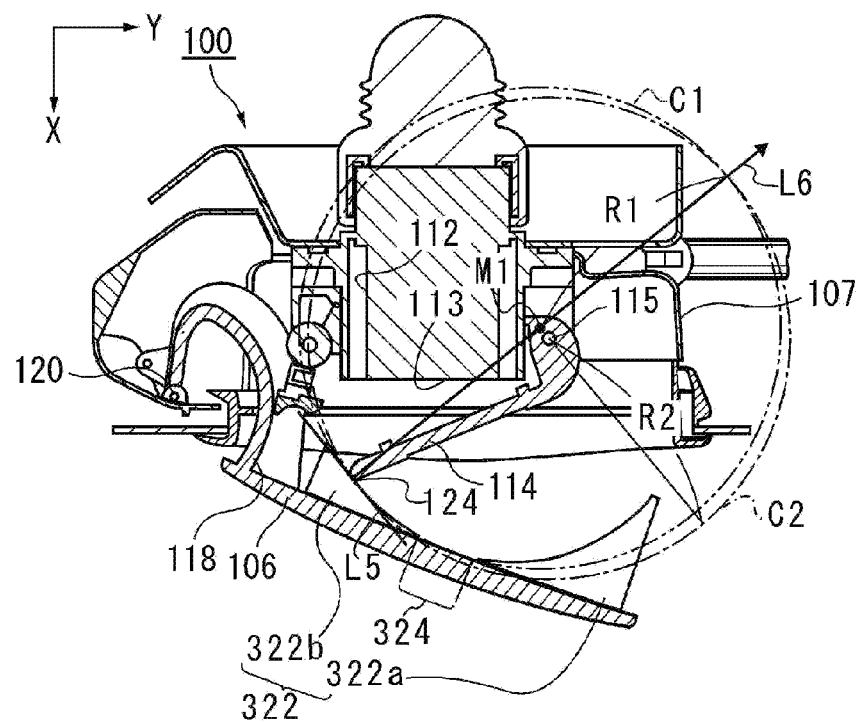
FIG. 8 is a diagram illustrating the second modified example of the charge connector.
Figure 8B:
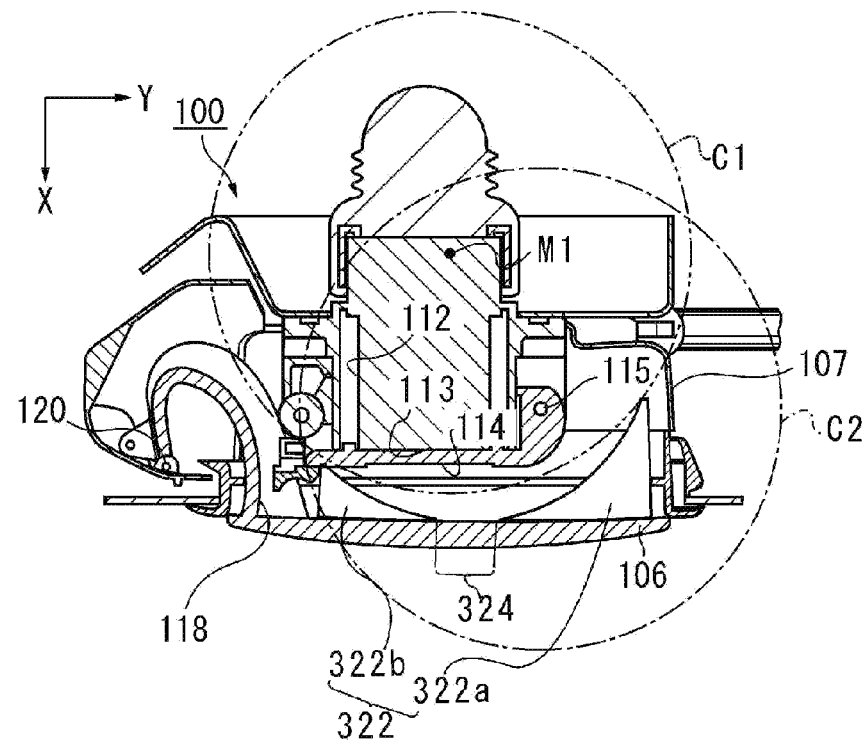

If the outer lid section 106 is further closed, the tip 124 of the inner lid section 114 reaches the root section 322b as shown in FIG. 8(a). The radius of curvature of the root section 322b is the radius R1, and a relatively gentle arc is depicted. Therefore, the inner lid section 114 is slowly and smoothly closed (FIG. 8(b)).

As described, even if the arc shape of the rib 322 is broken in the middle, the action of closing the inner lid section 114 can be associated with the action of closing the outer lid section 106.

Although preferred embodiments of the present embodiment have been described with reference to the attached drawings, of course the present invention is not limited to the examples. It is apparent that those skilled in the art can make various changes and modifications within the scope described in the claims, and it is understood that the changes and the modifications obviously belong to the technical scope of the present invention.

INDUSTRIAL APPLICABILITY

The present invention can be used as a charge connector installed on a vehicle including a battery that can be charged from an external power supply, wherein a cable for charging is plugged into the charge connector.

The invention claimed is:

1. A charge connector comprising:
an opening section arranged on a vehicle;
a connector connection section installed inside of the opening section and to which a plug of a cable for charging a battery of the vehicle is connected;
an inner lid section that seals the connector connection section inside of the opening section;
an inner lid hinge that is installed inside of the opening section and that rotates the inner lid section;
an outer lid section that seals the opening section from outside of the vehicle; and
an outer lid hinge that is installed on an opposite side of the inner lid hinge around the connector connection section and that rotates the outer lid section in a same plane as the inner lid section, wherein
the outer lid section comprises a rib that projects inside of the opening section on a surface closer to the opening section,
the rib can be in contact with the inner lid section, and
when the rib is in contact with the inner lid section, the rib is formed so that a normal line at a point of contact with the inner lid section in the plane, in which the inner lid section rotates, passes on a side of the inner lid hinge closer to the outer lid hinge, and the rib has an arc shape, and a center of the rib is on the side of the inner lid hinge closer to the outer lid hinge in a plane, in which the outer lid hinge rotates.

2. The charge connector according to claim 1, wherein the arc shape of the rib has a same radius of curvature as that of a circle depicted by a tip of the rotating inner lid section.

3. The charge connector according to claim 1, wherein the rib comprises:
a tip section arranged closer to a tip of the outer lid section; and
a root section arranged closer to a root of the outer lid section,
the radius of curvature of the tip section is smaller than the radius of curvature of the circle depicted by the tip of the rotating inner lid section, and
the radius of curvature of the root section is equal to or greater than the radius of curvature of the circle depicted by the tip of the rotating inner lid section.

4. The charge connector according to claim 3, wherein the radius of curvature of the tip section and the root section gradually change from the tip section to the root section.

5. The charge connector according to claim 3, wherein the tip section and the root section are separate from each other, and the outer lid section further comprises a plane section arranged between the tip section and the root section.

6. The charge connector according to claim 1, wherein an amount of projection of the rib inside of the opening section on a side closer to the root is an amount of abutment with the inner lid section that seals the connector connection section when the outer lid section is closed.

* * * * *